April 22, 1969 P. BOUBEE 3,439,990
DEVICE FOR CYCLICALLY ACTIVATING A HEATING APPLIANCE
CONTROLLED BY A THERMOSTAT
Filed June 30, 1967

United States Patent Office 3,439,990
Patented Apr. 22, 1969

1

3,439,990
DEVICE FOR CYCLICALLY ACTIVATING A HEATING APPLIANCE CONTROLLED BY A THERMOSTAT
Pierre Boubee, 26, Ave. des Gressets, La Celle-Saint-Cloud, Yvelines, France
Filed June 30, 1967, Ser. No. 650,506
Claims priority, application France, July 6, 1966, 68,437
Int. Cl. F23n 5/02, 5/22
U.S. Cl. 431—69     10 Claims

ABSTRACT OF THE DISCLOSURE

A temperature-responsive control apparatus for fluid fuel burners in which the combustion configuration and dormant configuration are controlled by cam operated swtiches. The cams are mounted on the shaft of a motor, the energization of which is controlled by switches operated by selected ones of these cams, a thermostatic switch which selects one of two possible energization loops, for the motor corresponding to the dormant and combustion configurations and an ignition sensitive switch. The cams employed are also programmed to shut down the burners in the event of a malfunction.

---

This invention relates to a device for controlling a fluid-fuel-fired heating appliance and for ensuring reliable operation thereof.

The invention likewise relates to a simple and remarkably compact form of embodiment of a control device of the kind described.

Recourse has already been had to devices for controlling the functional cycles of a heating appliance by a fluid fuel such as gas or fuel oil in order to maintain the temperature of a room or premises within a temperature range corresponding to the adjustment range of a temperature-sensitive servo-control element such as a thermostat in particular.

A major reason is that it is convenient to provide a predetermined, invariable fuel feed to the burner of such an appliance and to utilize a thermostat in order to trigger A first sequence of operations (air and fuel feed, ignition, flame control, lighter shutoff) which fetches the burner into a combustion configuration in the course of which the surrounding temperature influencing the thermostat gradually rises from the lowest to the highest value in its adjustment range, followed by A second sequence of operations (shutting off of the supply of fuel and subsequently of air) which fetches the appliance into a dormant configuration in the course of which the temperature influencing the thermostat gradually drops from the highest to the lowest value in said range.

With a view to being able to perform the operations in these two cycles whilst avoiding sequences, recourse has been had to devices of an electrical nature comprising a motor the function of which is to drive a compound system for controlling the supply currents to the component parts of the heating appliance and of the device itself, in order to accomplish a heating cycle. In order, however, to enable such a succession of operations to be performed under satisfactory safety conditions, devices of this kind include multiple networks of complex circuits and, in many instances also, triggering elements, thereby leading to costly designs.

Finally, in order to increase the reliability of such heating appliances, known control devices often include time delay means to extend certain operations (e.g., ignition) after the subsequent operation (combustion) has been ini-

2 tiated and/or before the end of the previous operation (fuel delivery). In practice, however, these devices have proved fragile and subject to malfunctions that run counter to the desired high standard of reliability of automatically operating heating appliances.

It is an object of the present invention to remedy these drawbacks and to accordingly provide a device comprising an electric motor associated to gear for activating the sequences of operations in a conventional functional cycle of a heating appliance equipped with a combustion governor. Such a device servo-controlled by a temperature-sensitive element invariably enables a safety shutoff configuration to be acquired (which may be displayed by indicator means) as the result of faulty combustion, faulty fuel feed, or malfunctioning of the components of the device itself.

It is another object of the invention to provide a robust and relatively simple control device which would avoid the need for triggering elements and time-delay means or means requiring delicate adjustments.

It is a further object of the invention to provide simplified circuits for such a device so as to obtain a remarkably compact constructional form.

In accordance with this invention, the motor equipping the device is series-connected to the two branches of a loop, which branches respectively permit electrical energization for execution of the first and second trains of operations in the cycle, corresponding respectively to the "too cold" and "too hot" effects of the thermostat. The "cold" branch includes a switch responsive to the "cold" effect of the thermostat whereby to trigger the first train of operations, while the 'hot" branch includes a switch operated by said motor whereby to activate the second train of operations leading up to the inoperative configuration of the appliance, means being provided to cut off the power supply to said motor through said "cold" branch, through the agency of the combustion governor whereby to acquire the combustion-operative configuration, said means alternatively enabling a safety shutoff configuration to be achieved through suitable control of the motor in the event of a malfunction or absence of combustion.

Preferably, shutting off of the motor at the end of the first sequence of operations in the cycle is effected by switches operated by the gear associated to the motor in said device, which switches are connected into the "cold" branch of the loop or into shunt circuits thereof.

It is another teaching of the present invention that, in order to avoid utilizing components comprising time-delay means, the controls over the circuits for the burner components, notably the blower, the fuel injector and the lighter, are accomplished directly by the motor gear in the device.

The invention additionally relates to a particularly compact constructional form of a control device for a heating appliance of the kind described precedingly.

Other features and advantages of the present invention will become apparent from the description which follows with reference to the accompanying nonlimitative exemplary drawings, in which:

FIGURE 1 schematically illustrates the essential component parts of a heating appliance equipped with a control device according to the present invention;

FIGURES 2a to 5a are charts depicting the operations capable of being performed by the devices shown in FIGURES 2 to 5 respectively;

Figure 1:
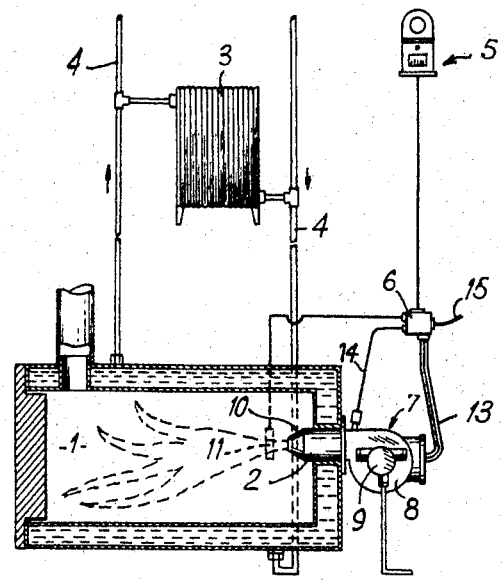

FIGURE 1 shows a conventional boiler 1 equipped with a fuel-oil burner 2 for supplying hot water, in the manner well known per se, to radiators 3 (only one of which is shown in the drawing) through pipes 4.

It will be explained in greater detail hereinafter how the "hot" and "cold" effects of a thermostat 5 make it possible through a device 6 to activate the burner 2 so as to maintain the temperature of the room containing the radiators and the thermostat virtually constant.

The burner includes an electric motor (not shown) adapted to drive a blower 8 and a pump 9 which respectively ensure predetermined, constant flow rates of air and fuel oil so as to cause a spray to be produced which is ignited by an electrode-type lighter 10, a photosensitive cell 11 being exposed to the radiation from the flame.

Figure 2:
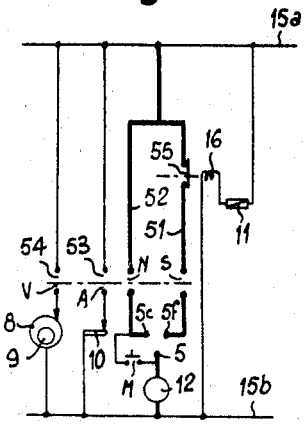
FIGURES 2 to 5 represent possible circuit diagrams for a control device according to the invention.

The constructional form of the device 6 shown in FIGURE 2 includes a motor 12 which rotates a set of cams adapted to operate the following:

Switches N, S, connected respectively into two parallel branches 51 and 52 forming a loop for energizing the motor 12 in series, off leads 15a, 15b connected to a mains supply;

Switches 53, 54, respectively connected into the circuits for energizing the lighter 10, the motor of blower 8 and the injection pump 9.

Changeover-type thermostat 5 is series-connected into these two branches. The "cold" terminal 5f is connected into branch 51. Photosensitive cell 11 is connected to a relay 16 whereby to form a flame monitor capable of operating a switch 55 connected into said branch 51.

It will readily be appreciated that with the burner in the inoperative position R1 (see FIGURE 2a), the temperature in the room will gradually drop due to the heat transfers to the exterior, until it reaches the lower limit of the adjustment range of thermostat 5. The latter will then trip on to its "cold" terminal 5f and, with switch S closed, motor 12 will be energized via the branch 51 and cause the switches N, 53, 54 shown diagrammatically in FIGURE 2a to be operated in turn. The bold lines and the faint lines correspond respectively to the periods of opening and closing of these switches. A first sequence of operations in a functional cycle of burner 2 is thus triggered as follows:

Closure of switch 53 so as to activate lighter 10, followed by

Closure of switch 54 so as to cause air and fuel to be supplied until the flame operates on the system 11, 16 to cause actuation of switch 55 and shutting off of the current to motor 12, the burner then being in its combustion position C.

Combustion continues until the temperature affecting the thermostat reaches the upper limit of the adjustment range, whereupon the thermostat trips on to the "hot" terminal 5c and energizes motor 12 through branch 52, while the switch N in branch 52, which was closed during the first sequence, causes the set of control cams to be activated for performance of the operations in a second sequence thereof, namely:

Opening of switch 54 in order to shut off the fuel and air supplies, followed by Opening of switch N in order to obtain a fresh inoperative position R2.

Figure 2A:

The chart in FIGURE 2a also clearly shows that if a flame should be absent during the first sequence of operations in the cycle, prior to the combustion position C, switch 55 will remain closed so as to energize the motor until a shut-off position S is reached. This ensures a safe configuration for the heating appliance since the camming system cannot leave this malfunction position otherwise than through manual intervention (to which further reference will be made hereinafter).

This S position would likewise be reached in the event of malfunctioning of the sensing system 11–16 since, with switch 55 closed, the second sequence of operations would be performed via the "cold" branch 51.

Further, in the event of an accidental power failure during the combustion phase, with the thermostat in the "cold" position, it could be advantageous, as soon as power is restored, to perform a fresh ignition operation as favourable to satisfactory combustion as ignition at the start of the cycle.

Figure 3:
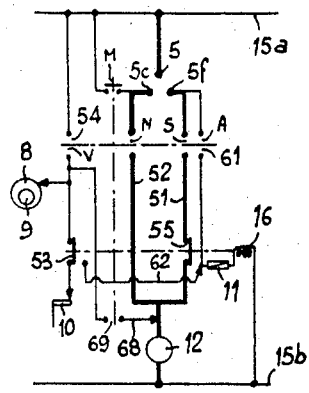

The camming system associated with motor 12 (FIGURE 3) is accordingly provided with an ignition cam having a plurality of cogs, e.g., three for operating a switch 61, each cog being responsible for obtaining one of the combustion positions C1, C2, C3 following a protracted ignition period.

However, when the operations in the first sequence have been normally carried out (with the burner in the combustion position C1) and when motor 12 energized once more in response to the "heat" effect from thermostat 5 so as to reach the inoperative position R2, the last two cogs on the lighting cam will operate on lighter 10 and, if the latter should be controlled by relay 16 of the flame sensing system, the contact points of relay 16 could be subjected to accelerated wear, for in such cases the switches 53 and 55 are to be considered as one and the same as two sets of release contact studs in a two-pole relay 16.

This disadvantage can be overcome preferably by causing relay 16 to be continuously energized while the motor is being driven, this being accomplished by means of a wire 62 connected between an "operate" contact stud of the relay and a wire interconnecting flame sensor 11 and ignition switch 61.

Furthermore, in the event of flame lift, such an arrangement will enable the lighter to operate in a way highly favourable to flame stability since it would operate during the time elapsing between passage of the C1 and C2 teeth.

In addition, although in the two constructional forms described hereinabove a changeover-type thermostat was chosen series-connected directly into the supply loop to motor 12, it would alternatively be possible to use a changeover relay controlled by a one-way thermostat.

It would moreover be possible to control only the branch 51 by the "too cold" effect of a thermostat (see FIGURE 4), and, in an alternative design, to cause the stoppages of motor 12 corresponding to the inoperative, combustion, and safety positions R, C and S, respectively, to be produced by a shunt circuit connected across the motor 12 so as to shunt the feed current to the latter.

Such a shunt circuit comprises two electrical leads 57, 58 incorporating their respective switches $S_1$ and 61 and have one of their ends connected to one of the loop branches 51 or 52, between motor 12 and the switches connected into these branches. Because of the heat which may be given off during such stoppages by the shunted current, it will be advantageous to series-connect, between the mains lead 15b and the shunt point of leads 57, 58, an element 59 offering a reactive impedance, such as an inductance coil of a capacitor.

Also, the use of such an element 59 could result in a current consumption in the shunt circuit not substantially different from the consumption of the motor 12 itself. The motor may accordingly be caused to stop in the C combustion position by incorporating the flame sensing element 11 (the current-transmitting capacity of which is small) directly into branch 58.

Figure 4:
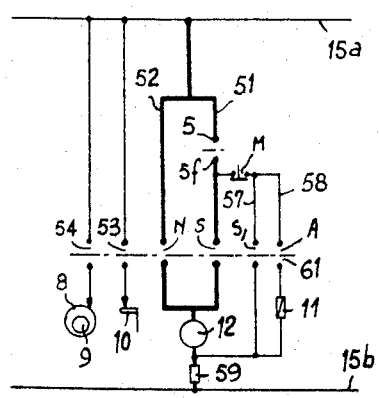
Figure 4A:
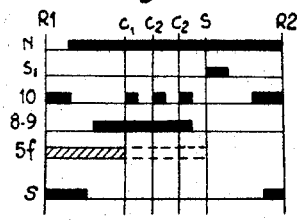
Figure 3A:
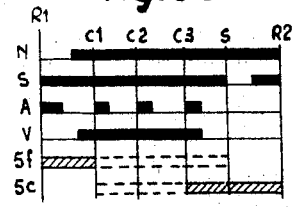

The switch S in cold branch 51 is timed as shown in FIGURE 4a such that it opens shortly after the closure of switch N and closes again just prior to the state R2. In this manner the closure of the thermostat contact 5f energizes the motor 12 which then remains energized through switch N until the ignition causes element 11 to short the terminals of motor 12. By virtue of the switch S, the opening of the thermostat contact 5f, when the desired temperature is achieved, the shunt circuit, including leads 57 and 58, is removed from the motor 12 to thereby enable its energization through the closed circuit N.

Further, circumstances unconnected with normal operation of the burner of a heating appliance may require shutting off of the latter, examples being a chimney fire, rupturing of the fuel line, faulty water circulation in the boiler, and so on.

Such shutting off of the appliance may be effected by a conventional sensing element 69 (FIGURE 3) series-connected into a lead 68 in order to supply a current capable of energizing motor 12 and fetching the device into its safe configuration regardless of whether the thermostat is in the "hot" or "cold" position.

Following a stoppage in the safe configuration, the subject device of this invention can be rendered operative preferably by means of a pushbutton switch M designed to override the means having caused stoppage of the motor. In the case of a device (see FIGURES 2 and 3) of which the branch 52 comprises a switch responsive to the "hot" effect of the thermostat, this pushbutton may be series-connected into a wire for shorting out thermostat contact 5c.

A pushbutton switch may likewise be connected into the common portion of branches 57, 58 of the shunt circuit in order to open the latter and permit energization of the motor 12 (see FIGURE 4).

In view of the characteristics of the current which may flow through the wire connected to the pushbutton (low voltage current intensity) the latter may without disadvantage be remotely located from the heating appliance.

Further, in the event of accidental damage to switch N in branch 52, motor 12 would no longer be energized for performing the second sequence of burner extinction operations and for fetching the appliance into its dormant configuration, which would result in continuous combustion and serious attendant risk of overheating.

Figure 5:
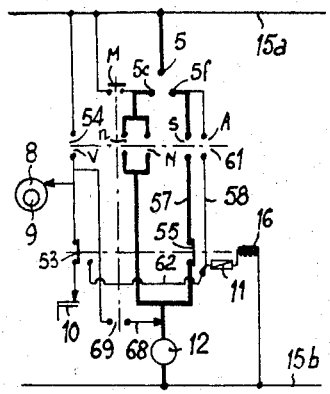
Figure 5A:
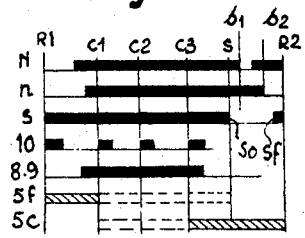

As FIGURE 5 shows, there is therefore preferably associated in parallel, to switch N, a second switch $n$ which is adapted to be closed by the camming system of motor 12 during the second sequence of operations, this second switch $n$ being opened prior to closure, at S$f$, of the switch in the "cold" branch, so as to produce a further safe stopping position $s2$ adjacent, for example, to the main position S.

Similarly, the N-switch cam is devised so as to cut off the supply to motor 12 and provide, in the event of damage to switch $n$, a further safe stopping position $s1$ lying within the safety sector SoS$f$.

In addition, such a control device can readily be devised in compact form.

FIGURE 5 shows the outline of a switchgear 70 adapted to protect:

A synchronous motor 12 of low rating (e.g., 3 watts) equipped with a reduction gear unit coupled to the first pinion of a gear train 71 and designed to produce a rotation speed of approximately one and a half revolutions per minute;

A set of cams keyed on to a shaft of polygonal section carrying the ultimate pinion of train 71 whereby to form a camming system 72 supported between two side plates;

Small snap switches 73 suitable for cam-type control, mounted facing the respective cam; and A three-pole relay 16.

These various components are fixed on to a mounting plate 74 made of insulating material and their supply leads are connected to two rows of pins 75 extending through said mounting plate.

The mounting plate is contoured so as to fit snugly into the switchgear box and its edge are notched (not shown) to receive tabs formed on a flat enclosure 76 bearing two terminal strips 76a which impose a unique position of engagement of pins 75 into companion sockets 77 mounted on terminal strips 76a.

Figure 7:
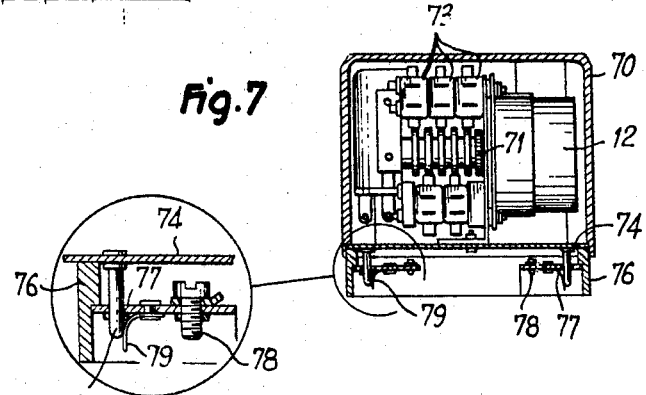
FIGURES 7 and 8 show the device of FIGURE 5 in plan view and in section respectively.

In addition, said terminal strips are equipped with terminals 78 for connecting the circuit wires, and contact between each socket 77 and its pin 75 is preferably obtained by a plain elastic blade 79 associated to each terminal 78 (see FIGURE 7). Such an arrangement is obviously easy to manufacture and avoids the coupling and uncoupling difficulties encountered with conventional pins.

Moreover, the layout used for the mounting plate elements reduces the longitudinal length of the wires to each circuit.

Figure 6:
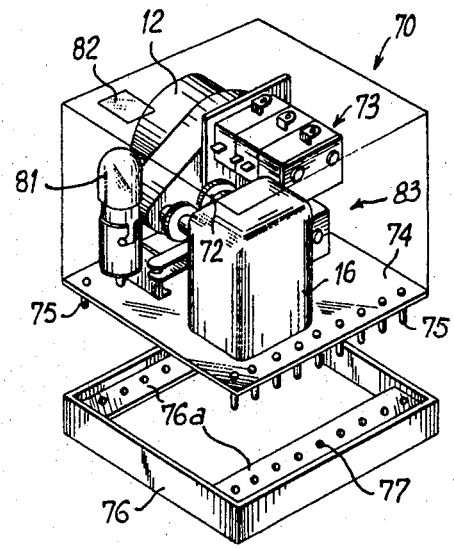
FIGURE 6 is a perspective portrayal of a form of embodiment of a control device according to the invention.
Figure 8:
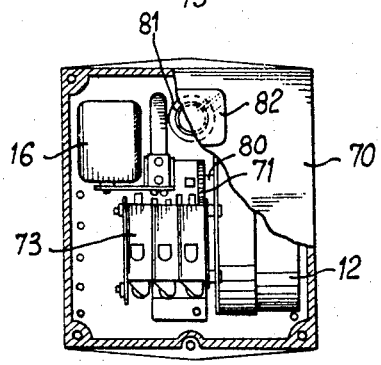

Also, the transverse dimensions of switchgear unit 70 are reduced to a minimum; indeed, as FIGURES 6 to 8 show, the gear train 71 enables the end of reduction gear shaft 80 to be positioned on the same side as the camming system, thereby enabling the latter to be moved nearer to the motor side plate by a distance equal to length of said shaft end.

Furthermore, as FIGURE 7 clearly shows, the switches are arranged on two mutually staggered sets on opposite sides of a diametrical plane through the camshaft and are therefore spaced from one another by an interval equal to half the width of a switch. Obviously, one set of switches contains one switch less than the other set, but on the other hand it is possible to accommodate, inside the transverse space occupied by these sets, a camming system that is only one unit short of having twice as many cams as would a normally stacked system.

In addition, in order to further reduce the overall bulk of the system, each cam operates directly on the pushrod of its associated switch, thereby making an additional saving of one lever.

Obviously many changes and substitutions of parts may be made to the specific forms of embodiment described hereinabove without departing from the spirit and scope of the invention.

What I claim is:

1. A control mechanism including a blower, fuel injector and lighter for a burner of fluid fuel, further comprising:
    a working set of interrupter circuits;
    a motor operatively associated with said circuits for controlling the operation thereof;
    two branches of a circuit loop coupled to said motor;
    a thermostat switch operatively located with respect to said branches to conductively engage a respective one upon hot and cold reactions of said thermostat;
    at least one circuit interrupter operatively located within each of said branches and associated with said motor; and
    flame sensing means in proximity to said burner and in operative relation with said branches for controlling the operation of said motor and of said burner and wherein said flame sensing means is operatively associated to stop the burner in the case of breakdown or absence of combustion.

2. A control mechanism according to claim 1, wherein the operations of said blower, fuel injector and lighter are controlled by additional circuit interrupters respectively in circuit therewith.

3. A control mechanism according to claim 2, including:
    a stop circuit operatively associated with said burner;
    a third interrupter in said stop circuit; and
    a lighting cam coupled to said motor and having a plurality of cogs to control said third interrupters.

4. A control mechanism according to claim 3, including:
    a relay in circuit with said flame sensing means;
    one of said additional interrupters being in circuit with said lighter and being controlled by said relay;
    said additional interrupter having a working contact for feeding said relay under the warm effect of the thermostat.

5. A control mechanism according to claim 3, wherein said stop circuit is mounted in a shunting manner with respect to a predetermined one of said branches.

6. A control mechanism according to claim 5, including:
   a feeding circuit for said motor; and
   a reactive impedance mounted in series between said feeding network and said shunting stop circuit of the motor.

7. A control mechanism according to claim 6, wherein the shunting stop circuit of the motor comprises two parallel branches at least one of which is coupled to said flame sensing means.

8. A control mechanism according to claim 7, including:
   a fourth interrupter in parallel circuit with a predetermined one of said interrupters located within one of said branches;
   said fourth interrupter being fitted to insure, in the case of deterioration or breakdown of one of them, at least two safety stop positions.

9. A control mechanism according to claim 8 wherein each of said interrupters are individually distributed in staggered arrangement according to, at least, two groups disposed on one side and the other of the shaft of said mechanism and presenting a lateral displacement corresponding to half the width of one of them.

10. A control mechanism according to claim 9 wherein said interrupters are of the abrupt interruption type and comprise pushrods attached, directly by cams.

References Cited
UNITED STATES PATENTS

| | | |
|---|---|---|
| 1,605,299 | 11/1926 | Sweatt et al. |
| 1,707,459 | 4/1929 | Clurman. |
| 2,388,666 | 11/1945 | Bower. |

JAMES W. WESTHAVER, *Primary Examiner.*

U.S. Cl. X.R.

431—73